(12) United States Patent
Eleftheriou et al.

(10) Patent No.: US 9,990,395 B2
(45) Date of Patent: Jun. 5, 2018

(54) TAPE DRIVE SYSTEM SERVER

(71) Applicant: International Business Machines Corporation, Armonk, NY (US)

(72) Inventors: Evangelos S. Eleftheriou, Rueschlikon (CH); Robert Haas, Rueschlikon (CH); Nils Haustein, Mainz (DE); Jens Jelitto, Rueschlikon (CH); Ioannis Koltsidas, Rueschlikon (CH); Slavisa Sarafijanovic, Rueschlikon (CH); Alexander Saupp, Mainz (DE); Harald Seipp, Mainz (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 299 days.

(21) Appl. No.: 14/365,242

(22) PCT Filed: Nov. 20, 2012

(86) PCT No.: PCT/IB2012/056564
§ 371 (c)(1),
(2) Date: Jun. 13, 2014

(87) PCT Pub. No.: WO2013/088284
PCT Pub. Date: Jun. 20, 2013

(65) Prior Publication Data
US 2014/0330817 A1 Nov. 6, 2014

(30) Foreign Application Priority Data

Dec. 16, 2011 (EP) ..................................... 11194117

(51) Int. Cl.
*G06F 7/00* (2006.01)
*G06F 17/30* (2006.01)
(Continued)

(52) U.S. Cl.
CPC ...... *G06F 17/30424* (2013.01); *G06F 3/0611* (2013.01); *G06F 3/0656* (2013.01);
(Continued)

(58) Field of Classification Search
CPC ............. G06F 2212/213; G06F 3/0686; G06F 3/0682; G06F 17/30091; G06F 17/30424;
(Continued)

(56) References Cited

U.S. PATENT DOCUMENTS 4,755,928 A * 7/1988 Johnson ............... G06F 12/0866
711/E12.019
4,962,451 A * 10/1990 Case ........................ G06F 7/24
(Continued)

FOREIGN PATENT DOCUMENTS

CN 1584986 A 2/2005
CN 1829979 A 9/2006
(Continued)

OTHER PUBLICATIONS

PCT International Search Report and Written Opinion; International Application No. PCT/IB2012/056564; International Filing Date: November 20, 2012; Dated Mar. 12, 2013; pp. 1-8
(Continued)

*Primary Examiner* — Hasanul Mobin
(74) *Attorney, Agent, or Firm* — Cantor Colburn LLP

(57) ABSTRACT

A tape drive system server includes a non-volatile memory used as a cache memory for storing data files, at least part of the cache memory comprising a first region managed using a First In First Out policy management and a second region managed using a Least Recently Used policy management; a file system interface for interacting with data files stored on a tape drive system; an interface for allowing one or more remote systems reading and writing data stored on the cache memory; the server configured to: receive from
(Continued)

the one or more remote systems one or more write requests for writing one or more data files; interpret attributes associated to data files instructed to be written by the one or more remote systems; and store data files instructed to be written by the remote systems according to the interpreted attributes.

15 Claims, 3 Drawing Sheets

(51) Int. Cl.
    *G06F 3/06*         (2006.01)
    *G06F 12/0804*   (2016.01)
    *G06F 12/0871*   (2016.01)
    *G06F 12/123*    (2016.01)

(52) U.S. Cl.
    CPC .......... *G06F 3/0659* (2013.01); *G06F 3/0686* (2013.01); *G06F 12/0804* (2013.01); *G06F 12/0871* (2013.01); *G06F 17/30091* (2013.01); *G06F 12/123* (2013.01); *G06F 2212/213* (2013.01); *G06F 2212/282* (2013.01)

(58) Field of Classification Search
    CPC ......... G06F 2212/224; G06F 2212/282; G06F 3/0683
    See application file for complete search history.

(56) References Cited

U.S. PATENT DOCUMENTS

| | | | |
|---|---|---|---|
| 5,829,046 A | | 10/1998 | Tzelnic et al. |
| 5,926,834 A | * | 7/1999 | Carlson ............... G06F 12/0862 711/118 |
| 6,418,515 B1 | * | 7/2002 | Kurosawa ........... G06F 12/0804 711/135 |
| 6,601,143 B1 | * | 7/2003 | Lamparter ............ G06F 12/127 711/133 |
| 7,162,574 B2 | | 1/2007 | Dawson et al. |
| 7,624,118 B2 | | 11/2009 | Schipunov et al. |
| 7,743,206 B2 | | 6/2010 | Kishi et al. |
| 7,747,816 B1 | | 6/2010 | Nourmohamadian et al. |
| 8,327,430 B2 | | 12/2012 | Hamilton et al. |
| 9,852,076 B1 | * | 12/2017 | Garg .................. G06F 12/0868 |
| 2002/0032671 A1 | * | 3/2002 | Iinuma ................. G06F 12/122 |
| 2005/0055511 A1 | | 3/2005 | Schreter |
| 2005/0055512 A1 | * | 3/2005 | Kishi ................. G06F 12/0804 711/135 |
| 2006/0126209 A1 | | 6/2006 | Starr et al. |
| 2006/0143396 A1 | * | 6/2006 | Cabot ................... G06F 12/121 711/134 |
| 2006/0190924 A1 | * | 8/2006 | Bruening ............ G06F 12/0875 717/104 |
| 2007/0294475 A1 | * | 12/2007 | Kobayashi .......... G06F 12/0804 711/113 |
| 2008/0313403 A1 | * | 12/2008 | Niranjan ................. G06F 3/061 711/120 |
| 2009/0006734 A1 | * | 1/2009 | Kishi .................... G06F 3/0611 711/111 |
| 2009/0213482 A1 | * | 8/2009 | Fujihara ............. G11B 5/00813 360/55 |
| 2010/0100680 A1 | * | 4/2010 | Koseki ................ G06F 12/0873 711/118 |
| 2011/0040937 A1 | | 2/2011 | Augenstein et al. |
| 2011/0145494 A1 | | 6/2011 | Mitsuma et al. |
| 2011/0145501 A1 | * | 6/2011 | Steely, Jr. ........... G06F 12/0806 711/121 |
| 2011/0219184 A1 | | 9/2011 | Jaquette et al. |
| 2011/0238906 A1 | | 9/2011 | Amir et al. |
| 2012/0133964 A1 | * | 5/2012 | Hayakawa ............ G06F 3/1211 358/1.13 |
| 2012/0311602 A1 | * | 12/2012 | Deguchi ................. G06F 3/061 718/105 |

FOREIGN PATENT DOCUMENTS

| | | |
|---|---|---|
| CN | 101149931 A | 3/2008 |
| CN | 102576294 A | 7/2012 |
| EP | 1505506 A1 | 2/2005 |
| EP | 2466466 A1 | 6/2012 |
| TW | 200820023 A | 5/2008 |
| TW | 200905515 A | 2/2009 |
| WO | 2005015408 A1 | 2/2005 |
| WO | 2011043114 A1 | 4/2011 |

OTHER PUBLICATIONS

SearchStorage, [online]; [retrieved on Feb. 26, 2014]; retrieved from the Internet http://searchstorage.techtarget.com/news/1510444/IBM-launches-Long-Term-File-System-LTFS-for-LTO-5-tape-management Beth Pariseau, "IBM Launches Long Term File System (LTFS) for LTO-5 tape Management," SearchStorage, Apr. 22, 2010, pp. 1-2.
IBM, "Virtual Tape Library for HSM," IP.com, IPCOM000189493D, Nov. 12, 2009, pp. 1-2.
PCT International Search Report; International Application No. PCT/IB2012/056564; International Filing Date: Nov. 20, 2012; Dated Mar. 12, 2013; pp. 1-2

\* cited by examiner

TAPE DRIVE SYSTEM SERVER

PRIORITY

This is a U.S. national stage of application No. PCT/IB2012/056564, filed on Nov. 20, 2012. Priority under 35 U.S.C. § 119(a) and 35 U.S.C. § 365(b) is claimed from European Patent Application No. 11194117.5, filed Dec. 16, 2011, and all the benefits accruing therefrom under 35 U.S.C. § 119, the contents of which in its entirety are herein incorporated by reference.

FIELD OF THE INVENTION

The invention relates to the field of cache architecture for tape drive system, and specifically to a tape drive system server.

BACKGROUND

Despite the significant progress of HDD (hard disk drive) technology over the past years, magnetic tape systems constitute an integral part of current tiered storage infrastructures. Tape technology offers several important advantages including low-cost, long-term storage of data as well as for backup and disaster recovery purposes, energy savings, security, lifetime, and reliability.

Once data has been recorded in tape systems, the medium is passive. This means that it simply sits in a rack and no power is needed. Compared with similar disk-based systems, a tape-based archive consumes approximately 290 times less power. In terms of security, once data has been recorded and the cartridge removed from the access system, the data is inaccessible until the cartridge is reinstalled in the active system. Security is further enhanced by drive-level encryption, which was introduced in Linear Tape Open generation-4 drives (LTO-4) and is also standard in enterprise-level tape drives. The tape medium has a lifetime of 30+ years; however, this is rarely taken advantage of because of the rapid advances in tape hardware and the cost savings associated with migration to higher-capacity cartridges. In terms of reliability, LTO-4 tape has a bit error rate that is at least an order of magnitude better than that of a SAS (Serial Attached SCSI) HDD. Moreover, the fact that tape media is removable and interchangeable, means that, in contrast to HDDs, mechanical failure of a tape drive does not lead to data loss because a cartridge can simply be mounted in another drive.

All of the above advantages contribute to the major net advantages of tape system, which are cost and reliability. Estimates of cost savings between disk and tape range from a factor of three to more than 20.

Hard disks provide random access to data and generally contain a file index managed by a file system. These files can be accessed by means of standard sets of application programming interfaces (APIs) using various operating systems and applications. Tape, in contrast, is written in a linear sequential fashion typically using a technique called "shingling" which provides backward write compatibility, but also implies that new data can only be appended at the end and that previously written areas can only be reclaimed if the entire cartridge is reclaimed and rewritten. In traditional tape systems, an index of the files written on a given cartridge is usually only kept in an external database managed by an application such as a proprietary back-up application. The need to access an external database to retrieve data renders data on tape much less portable and accessible than with alternative storage methods, such as a HDD or a USB (Universal Serial Bus) drive.

To address these deficiencies, a new file system, referred to as Linear Tape File System (LTFS), has recently been introduced in tape-drive systems to enable efficient access to tape using standard and familiar system tools and interfaces. LTFS is implemented by taking advantage of the dual-partition capabilities supported in recent tape drive formats. A so-called index partition is used for writing the index, and the second, much larger partition for the data itself. The index partition is used for the directory of the file system, whereas the data partition is used to store the actual user's files in the file system. Placing the index on a separate partition is advantageous because it can be rewritten without impacting the actual data. LTFS exposes a POSIX-like file system interface to the user, manages the file system index in the index partition and stores the data in the data partition. The file system represented by the LTFS software makes files and directories show up on the desktop with a directory listing while the files are actually located on tape. File system users can "drag and drop" files to and from tape and can run applications developed for disk systems. In library mode, the content of all volumes in the library can be listed and searched without mounting the individual cartridges. All these features help reduce tape, file management and archive costs and eliminate the dependency on a middleware layer. Hence the cost per gigabyte (GB) stored is reduced. In addition, tape becomes cross-platform-portable (LTFS is available on Linux®, Apple Mac OS X®, Microsoft Windows®), enabling and facilitating the sharing of data between platforms. These features enable significant new use cases for tape, such as video archives, medical images, etc. Considering the cost advantages of tape over other storage solutions, the demonstrated potential for the continued scaling of tape-cartridge capacity and cost per GB as well as the increasing usability of tape provided by advances such as the LTFS, tape appears set to play an important role in the exploding market for archival data storage solutions.

However, even with LTFS, files are stored in a sequential manner on tape which causes non-negligible longer access times during I/O operations such as read and write.

The documents US 2011/0219184 A1, US 2011/0145494 A1, U.S. Pat. No. 7,743,206 B2, U.S. Pat. No. 7,162,574 B2, U.S. Pat. No. 7,747,816 B1, U.S. Pat. No. 5,829,046, 'IBM Launches long term file system (LTFS) for LTO-5 tape management', Beth Parizeau, Apr. 22, 2010, and 'Virtual tape library for HSM', Nov. 12, 2009 are related to the field of the invention.

BRIEF SUMMARY OF THE INVENTION

According to a first aspect, the invention is embodied as a tape drive system server comprising:

a non-volatile memory which is used as a cache memory for storing data files, at least part of the cache memory comprising a first region that is managed using a First In First Out policy management and a second region that is managed using a Least Recently Used policy management;

a file system interface for interacting with data files stored on a tape drive system;

an interface for allowing one or more remote systems reading and writing data stored on the storage means and/or on the cache memory;

wherein the server is configured to:

receive from the one or more remote systems one or more write request for writing one or more data files to the tape drive system and to the cache memory;

interpret attributes associated to data files instructed to be written by the one or more remote systems to the tape drive system and to the cache memory; and store data files instructed to be written by the remote systems according to the interpreted attributes.

In embodiments, the a tape drive system server may comprise one or more of the following features:

cache management functions to interpret the attributes associated with the data files;

the attributes correspond to caching-priority classes;

a first caching-priority class causes the cache management functions to:

write data files instructed to be written to the first region of the cache memory;

subsequently copy data files stored on the a first region to tape drive system, the copy being performed as a background task of the server; and once the copy is finished, evict data files from the first region of the cache memory;

a second caching-priority class causes the cache management functions to:

write data files instructed to be written to the first region of the cache memory;

subsequently copy data files stored on the a first region to tape drive system, the copy being performed as a background task of the server;

determine whether, after a first read of the data files written to the first region, the data files are read one or more supplementary times;

in the event the data files are determined to be read one or more supplementary times, move the data files to the second region of the cache memory;

in the event the data files are not determined to be read one or more supplementary times, evict data files from the first region of the cache memory;

a third caching-priority class causes the cache management functions to:

prefetch on the first region of the cache memory a set of data files that were previously stored in the first region of the cache memory;

determine whether, after a first read of the prefetched set of data files, one or more data files of the prefetched set are read one or more supplementary times; and in the event one or more data files of the prefetched set are determined to be read one or more supplementary times, move the set of data files to the second region of the cache memory;

a fourth caching-priority class causes the cache management functions to prefetch on the second region of the cache memory a set of data files that were previously stored in the first region of the cache memory;

a fifth caching-priority class causes the cache management functions to:

place data files into the second region of the cache memory up to the maximum offset that has been accessed at any given time;

a sixth caching-priority class causes the cache management functions to:

place immediately data files into the first region of the cache memory when data files caching class is set, independently of whether the data files are accessed or not; and evict data files from the cache memory when a configurable time interval has expired.

a caching class is specified either by a user or an application, and the cache management functions further assign a default caching class for data files for which a caching class has not been specified by the user or the application.

the attributes are extended attributes, whose format is compatible with a given data format of the data file;

attributes associated with data files are used by the cache management functions to optimize concurrent data writes and/or reads by multiple users in parallel;

According to another aspect, the invention is embodied as a tape appliance system, comprising:

the tape drive system server of the present invention; and a tape drive system, the server interfaced therewith.

According to another aspect, the invention is embodied as a system comprising the tape drive system server of the present invention or the tape appliance system of the present invention, wherein the tape drive system is a tape library.

According to another aspect, the invention is embodied as a computer program, stored on a computer readable medium, comprising code means for causing the tape drive system server to perform cache management functions.

BRIEF DESCRIPTION OF THE DRAWINGS

A process and a process embodying the invention will now be described, by way of non-limiting example, and in reference to the accompanying drawings, where.

DETAILED DESCRIPTION OF THE EMBODIMENTS

Figure 1:
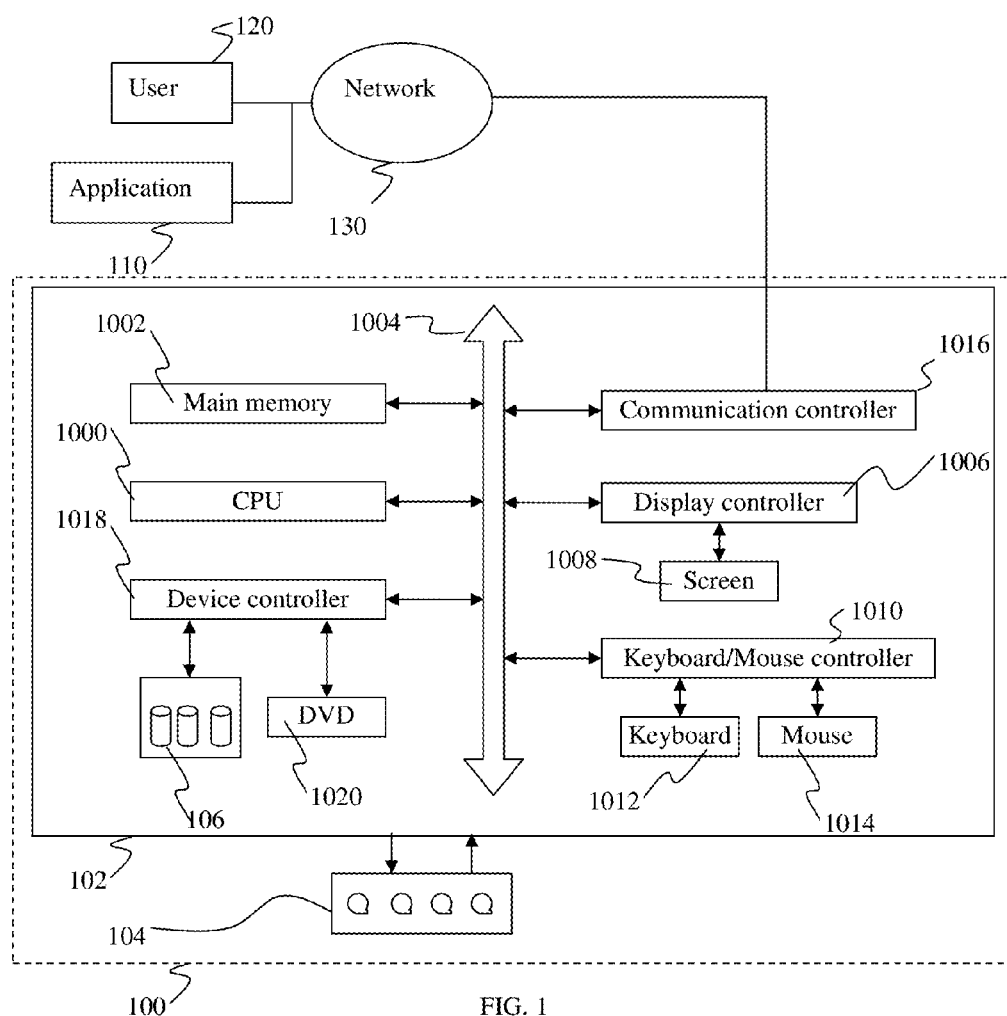
FIG. 1 is an example of an architecture view of a tape appliance system remotely accessed by other systems according to the invention.

The invention describes a tape drive system server. The tape drive system server comprises a non-volatile memory which is used as a cache memory for storing data files. At least part of the cache memory comprises a first region that is managed using a First In First Out (FIFO) policy management and a second region (42) that is managed using a Least Recently Used (LRU) policy management. The tape drive system server further comprises a file system interface for interacting with data files stored on a tape drive system. The tape drive system server further comprises an interface for allowing one or more remote systems reading and writing data stored on the storage means and/or on the cache memory. This interface may be a communication interface as those usually designed to a specific standard that enables one machine to telecommunicate with another machine. The tape drive system server is configured to receive from one or more remote systems one or more write requests. The write request is intended for writing one or more data files on the tape drive system and on the cache memory. This means that the write request may request writing one or more data files on the tape drive system solely, or writing one or more data files on the cache memory solely, or writing one or more data files on both the tape drive system and on the cache memory. The tape drive system server is further configured to interpret attributes associated to data files instructed to be written by the one or more remote systems on the tape drive system and on the cache memory. Interpreting an attribute means that the tape drive system server is able to determine which specific action to carry out according to the attribute. The tape drive system server is further configured to store data files instructed to be written by the remote systems according to the interpreted attributes. Storing the data files to be written amounts to say that the data files to be written are recorded.

Thus, the focus of the proposed invention is on a system that improves performance of a tape drive system (e.g. a tape storage system based on LTFS), not only in terms of access latency, but also in terms of flexibility of applying a caching strategy.

To that end, the tape drive system server uses a cache memory in concert with a file system interface for interacting with data files stored on a tape drive system. The cache memory is used as a caching layer above the storage means. The tape drive system server provides caching hints in the form of attributes. An attribute (also referred to as extended attribute) provides functionality and additional information on the file system interface, and more generally on the tape drive system server. Based on its interpretation of the attribute, the tape drive system server knows where and how to store the data files instructed by one or more remote systems to be written. Thus, the presented system provides not only caching strategy allowing a faster access to the most recently and or frequently cached files, but also is designed to allow an application or a user to modify the caching strategy according to its needs, e.g. according to the workload of the system.

As will be appreciated by one skilled in the art, aspects of the present invention may be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device (CD-R/W, DVD, BD), a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is an architecture view of an embodiment of a tape appliance system 100 remotely accessed by one or more remote systems 110, 120. The tape appliance 100 according to an embodiment of the invention comprises a tape drive system server 102 and a tape drive system 104 with which the tape drive system server is interfaced.

The tape drive system 104 may store data files according to a predetermined data format. The tape drive system may be a sequential-access media such as a standalone tape drive (or tape library), that can support a multitude of tape drives or heads. The standalone tape drive is used to operate on linear tape, on one or more tape cartridges. The predetermined data format of the data stored on the tape drive may use a LTFS format data-format that holds the file content data and associated file metadata. Thus, the data stored on the tape drive and written using LTFS format can be exchanged with others systems 110, 120 able to understand LTFS format.

The tape drive system server 102 according to the embodiment of FIG. 1 comprises a non-volatile memory 106 which is used as a cache memory for storing data files. The cache memory optimizes performances of the storage system, exploiting temporal and spatial locality of workloads. The cache memory is a read and write cache. The cache memory improves performance by transparently storing data such that future requests for that data can be served faster. If requested data is contained in the cache, that is, if a cache hit occurs, this request can be served by simply reading the cache, which is comparably faster than reading from the backend storage device. Otherwise a cache miss occurs and the data has to be fetched from the slower backend storage device.

The cache memory is a non-volatile memory, which advantageously allows retaining the files stored thereon when the tape drive system is turned off. The non-volatile memory which is used as the cache memory may comprise an array of hard disk drives and or solid state drives. The array of large-capacity HDDs and/or SSDs may be configured in a RAID (Redundant Array of Independent Disks) scheme. The cache memory controller may expose a single logical volume to the operating system of the server, thus making easier the management of the cache memory. Also, a conventional disk file system such as, but not limited to, ext3, ext4 or NTFS, is installed on that logical volume and is used for all I/O operations to the disk array. The cache memory, that is, the whole disk array, is dedicated to caching and is not shared with other components of the system.

The cache memory may be a file-level cache memory. Alternatively, the cache memory may be a block-level cache memory. In this case, HDDs and/or SSDs of the array are used as raw device, with no file system, and then volumes are created and an operating system connects to these volumes and uses them as individual hard drives. Block level cache memory is usable for almost any kind of application, including file storage, database storage, virtual machine file system (VMFS) volumes, and more.

Figure 4:
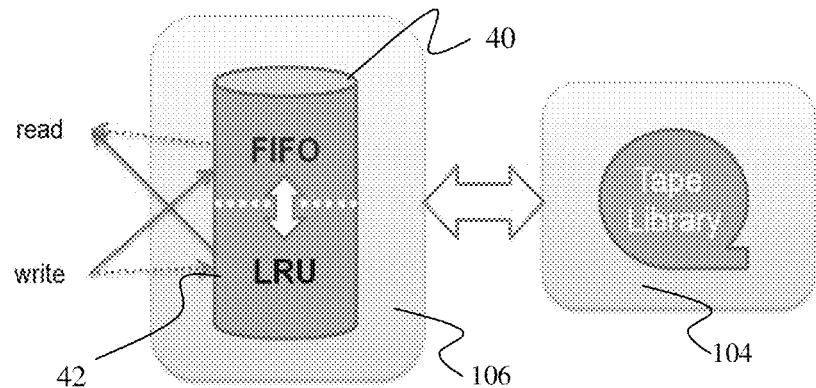
FIG. 4 is an example of the caching of the tape appliance system depicted on FIGS. 1-3.

Referring now to FIG. 4, an example of the cache memory of the tape drive system server 102 depicted on FIG. 1 is now discussed. The cache memory is a non-volatile storage, and therefore, the cache memory may safely hold both modified and unmodified data on a file level.

At least part of the cache memory 106 comprises a first 40 and second 42 regions or spaces. The first and second regions are adapted to store files originally stored in the storage means. The storage of files in the first and second regions is performed in accordance with a set of rules for cache capacity management.

The first region is a FIFO (First In First Out) region 40, and the second region is an LRU (Least Recently Used) region 42. This amounts to say that at least a part of the cache memory is divided into a FIFO cache and a LRU cache. The FIFO region is managed using a First-In-First-Out replacement policy, while the LRU region is managed using a Least-Recently-Used policy. The FIFO region is typically destined to hold files that will only be accessed at most once after they are written to the cache. This is for instance the case of a backup write-verification process. The LRU region is typically destined to cache files that have a high probability of multiple accesses in the near future.

As shown in FIG. 4, user writes will usually write their data to the FIFO cache, while user reads will usually be served by the LRU cache. However, this is not a requirement: indeed, incoming data may also be written to the LRU cache if the user hints that the data will be accessed multiple times in the near future. On the other hand, user reads may be served from the FIFO cache if the requested data is found to be there.

Optionally, at the same time, files are moved between the two regions of the cache depending on their workload: indeed, the cache memory has a limited storage-capacity size and its partition to a FIFO and LRU sections requires certain level of control. In other words, cache capacity is managed in accordance with a set of rules. The following rules for cache capacity management may be used:

If the FIFO region is full then the oldest files are evicted. Evicting files from the cache may require copying them first to tape;

If the LRU region is full then the files with the least number of access and the oldest last-access time are evicted. Evicting files from the cache may require copying them first to tape;

If the FIFO region is full and the LRU region has at least 50% free capacity then the FIFO region gains 30% of the LRU region capacity;

If the LRU region is full and the FIFO region has at least 50% free capacity then the LRU region gains 30% of the FIFO region capacity.

It is to be understood that the aforementioned percentages are design parameters and might change depending on the specific application and workload.

Referring back to FIG. 1, the tape drive system server 102 may comprise at least one Computer Processing Unit (CPU) 1000 or processor and a main memory 1002, typically Dynamic Random Access Memory (DRAM). The CPU and DRAM are connected to a bus 1004. The bus may be connected to a display controller 1006 which is connected to a display such as an LCD monitor 1008. The display may be used to display information about the tape appliance system 100. The bus may further be connected to a keyboard 1012 and a mouse 1014 through any keyboard/mouse controller 1010. The bus may also be connected to a communication controller 1014 which conforms to, for example, an Ethernet (registered trademark) protocol. The communication controller is used to physically connect the tape drive system server with a network, for instance the network 130. The bus is also connected to a storage device such hard disk 104 or DVD 1020 through a device controller 1018 such as an IDE/SATA, SCSI, Fibre Channel, Fibre Channel over Ethernet (FC0E) or iSCSI controller.

The tape drive system server further comprises a file system interface for interacting with data files stored on the tape drive system 104. The file system interface provides the tape drive system server with the capacities for communicating with the tape drive system and managing data files stored thereon, e.g. writing or reading data files. Hence, the tape drive system server 102 may be attached to the tape drive system 104 via the file system interface so that the tape drive system server can explore the underlying tape capacity which is therefore exposed. The file system interface may be LTFS software running on the tape drive system server.

The tape drive system server runs an operating system such as, but not limited to, the Linux (trademark) operating system. The server is connected to the network 130 and thereby remote network users 120 and applications 130 can mount storage means (e.g. LTFS file system) and directly store or retrieve data from the storage means.

Figure 3:
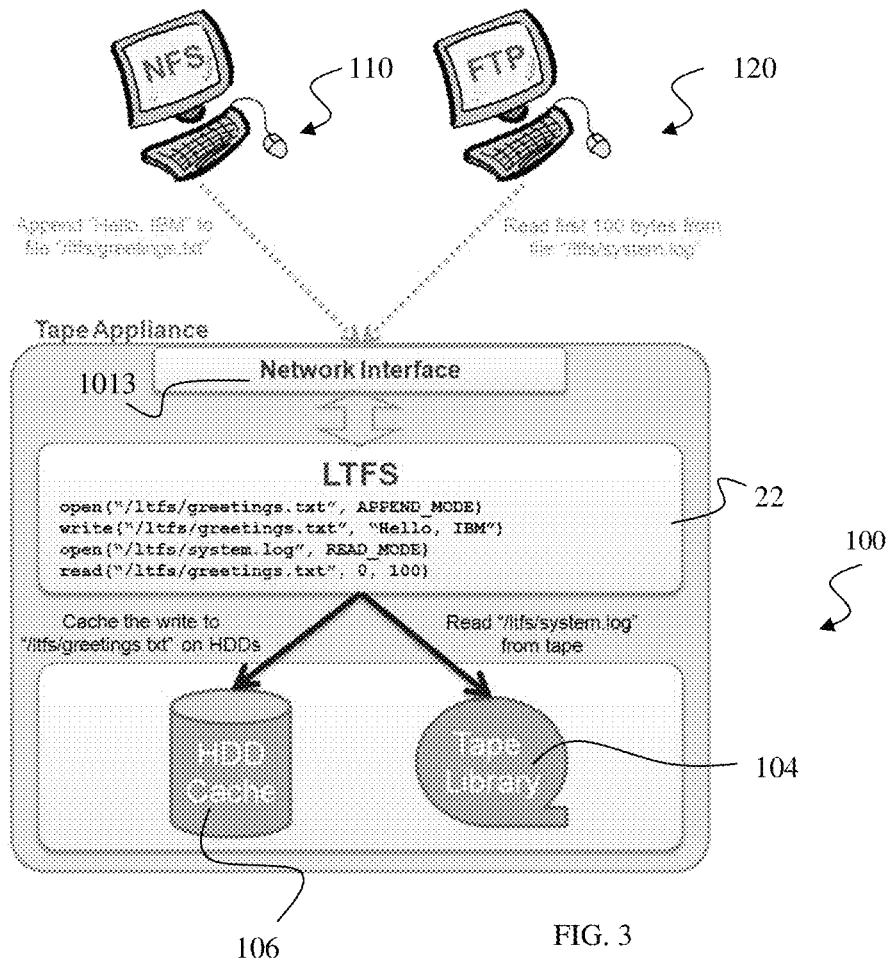
FIG. 3 is another example of data path view of the tape appliance system depicted on FIG. 1.

Referring now to FIG. 3, an example of data path view of the tape drive system server 102 depicted on FIG. 1 is shown. The tape drive system server 102 comprises a network interface, e.g. the communication controller 1016 in FIG. 1. Otherwise said, the tape drive system server comprises an interface for allowing one or more remote systems (110, 120) reading and writing data stored on the storage means and/or on the cache memory.

In FIG. 3, all I/O operations to the tape drive system 104 are realized as LTFS file system operations. For instance, a client's write to the tape drive system will always end up to be a write operation to an LTFS file starting at a specific offset and with a specific length in bytes, as illustrated on FIG. 3. In a first scenario, a remote user 110, issues a write to file "/ltfs/greetings.txt" using an NFS mount to the tape drive system server. The write request is managed by the tape drive system server that passes the request to the file system interface LTFS 22. Then LTFS finds this file to be already cached in the HDD cache 106 and the write is absorbed on the HDD, with "/ltfs/greetings.txt" being an ext3 file on the HDD file system. In a different scenario, another remote user 120 wants to read some bytes from a file on the tape appliance system using the FTP protocol. The user issues an FTP get request, which tape drive system server translates into an LTFS read request via the LTFS file system interface. The LTFS file system interface looks up the requested file in the cache memory 106, but does not find it to be there. Therefore, LTFS file system interface reads the requested file from the tape drive system 106 and returns the first 100 bytes to the user. At that point, LTFS may choose to cache the file on the HDDs 106 or not.

Figure 2:
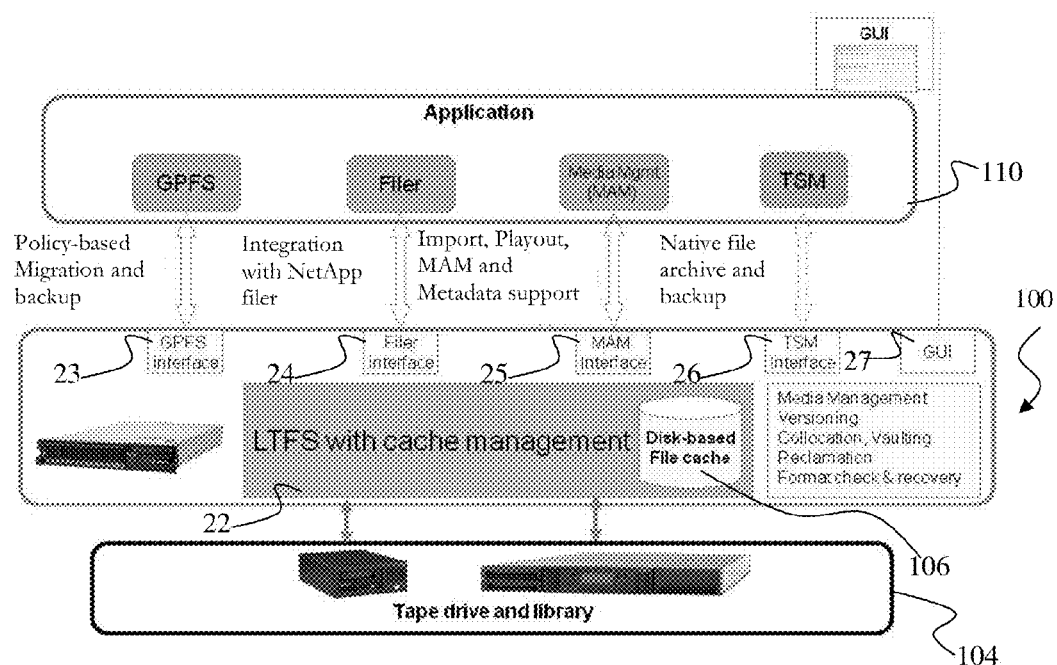
FIG. 2 is an example of data path view of the tape appliance system depicted on FIG. 1.

Referring now to FIG. 2, another example of data path view between a remote system such as an application or a client and the tape drive system server depicted on FIG. 1 is shown. The tape drive system server 102 is remotely accessed by systems such as an application 110 or a client 120, e.g. via a network. Other systems might be a file system server such as GPFS (General Parallel File System) cluster or NAS (Networkattached storage) filer.

Remote systems may access the tape drive system server either by mounting it using a network file system or by reading from and writing data to it using the FTP (File Transfer Protocol) protocol or the SSH (Secure SHell) protocol. It is to be understood that any other protocol may be used for remotely accessing the tape drive system server 102.

The tape drive system server 102 provides appropriate interfaces 23, 24, 25, 26, 27, as shown in FIG. 2, so that the tape drive system server can be used to accommodate storage needs for a multitude of applications 110. In FIG. 2, the tape drive system server comprises a file system interface for interacting with data files stored on a tape drive system (104), e.g. a multitude of tape drives. The following are examples of applications for managing files stored on the tape drives, including but not limited to:

1) Backup of a GPFS (or other) filesystem connected to the tape drive system server over the network. The entire GPFS file system or individual directories or file sets can be backed up into the tape appliance system. Full or incremental backups can be taken and multiple versions can be supported on the same or different tape cartridges. Additionally, multiple backups originating from the same or different file systems/clusters can be supported in the same appliance. Advantageously, LTFS enables the backup to be self-contained and self-describing on the tape cartridge, saving the user from the need to deploy and maintain a centralized backup server. In addition, the file attributes of GPFS can be preserved on LTFS, and also enforced with some modifications to LTFS. The backup process, which can be orchestrated either by a GPFS node or by the tape appliance itself, is outlined in the following steps:

a. A GPFS policy running in the cluster identifies the files that have changed since the last backup;

b. The policy invokes an external process to perform the backup;

c. The backup-process copies files to the appliance preserving the GPFS file
  attributes;

d. The copy operation may be done over SSH or using an NFS/CIFS mount;

e. When the process finishes, the tape cartridge may be removed and be put into a vault or be moved to any other system.

Files can be restored from the backup by just reading the tape, in the same or any other tape system, and leveraging the file system interface provided by LTFS, which allows to keep the same name-space as in GPFS. This means any file which has been backed up from the filer can have the name (path and file) in LTFS which allows easy recovery.

2) Migration of files from a GPFS (or other) filesystem, i.e., using the tape drive system as a tier in the storage hierarchy. The user specifies migration criteria for files or directories in the form of user-specified GPFS policies and the system seamlessly places the data on tape by migrating files that meet the aforementioned specified criteria, to the tape drive system. For each file migrating to the tape drive system, the file is replaced in GPFS by a file stub (a placeholder). Thereby, the files remain in the GPFS namespace and can be accessed as normal files by the users and the existing applications. Upon access to a migrated file, the file is recalled from the tape drive system.

3) Integration with NAS filers (e.g., NetApp filers) to copy old snapshots from the filer to LTFS and delete older snapshots from the filer. The advantage is that older snapshots, which typically require more storage capacity, are stored on tape drive system and can seamlessly be accessed through the LTFS file system interface which is can be a NAS interface such as NFS or CIFS provided by the NAS filer as well.

4) In Media Management (MAM), the medium often contains multiple versions of the same data stream. A common practice is to have a high definition version of an audio-video stream together with a so-called "proxy" which is a low-resolution version of the same content. It would be very beneficial to cache the files pertaining to the proxy as this is being used more frequently to edit/cut the content to produce a cut list that would be later on applied to the hi-def original stream to produce a playout stream or for direct playout.

5) Graphical User Interface for remotely managing the tape appliance system, including, but not limited to, media management, versioning, vaulting, format check and recovery of the stored files.

Hence, the tape drive system server comprises a non-volatile memory (e.g., HDDs/SSDs array) which is used as a cache memory and that may be logically configured into a single logical address space, a file system interface for interacting with data files stored on a tape drive system (e.g. one or more tape drives operating in parallel, as shown in FIG. 1), and an interface for allowing one or more remote systems reading and writing data stored on the storage means and/or on the cache memory.

The tape drive system server is further configured to receive from the one or more remote systems one or more write request for writing one or more data files on the tape drive system and on the cache memory. Practically, a write request is received by the interface intended for allowing one or more remote systems reading and writing data stored on the storage means and/or on the cache memory. This interface may be thus a communication interface as those usually designed to a specific standard that enables one machine to telecommunicate with another machine.

In addition, the tape drive system server is configured to interpret attributes associated to data files instructed to be written by the one or more remote system on the tape drive system and on the cache memory. By this way, caching hints are provided in the form of attributes. Typically, the attributes are extended attributes that have formats compatible with a given data format of the data files. Attributes are supported by the file system interface on a file and directory basis according to the POSIX standard. Advantageously, this allows an easier interpretation of the attributes by the file system interface (e.g. LTFS file system).

The attributes are in practice selected by the user 120 or the application 110: these advantageously allow the user or the application to provide caching hints in the form of extended attributes. The attributes thus correspond to caching-priority classes. Otherwise said, the user or the application can select a caching priority for a given data file. The name of the attribute may already contain the caching-priority information. The names of the attributes are preferably predefined.

Additionally, the tape drive system server is further configured to store data files instructed to be written by the remote systems according to the interpreted attributes. Hence, the caching of data files instructed to be written is performed based on the value of the attribute (e.g. the name of the attribute).

It is to be understood that caching priority selection can be provided by the user at any time and the caching priority selection for a file may change over time. For instance, the same user or application or a different user/application may provide a new hint or caching priority. The cache management will only change its caching decision for a file the next time it is accessed or earlier if the user/application explicitly requests. This advantageously improves the flexibility of the caching priority that may be modified by the user or the application depending on parameters such as the work load of the tape drive system server.

In its simplest form, a cache hint is the cache priority for a specific file. It is to be understood that a default cache priority class (e.g., Class 3) may be assumed by the tape drive system server, e.g. if the user or the application does not specify one.

Examples of caching-priority classes and their semantics are now discussed. The interpretation of the respective attributes may be typically performed by cache managing functions, and storage of data files instructed to be written according to the interpreted attribute may also be performed by cache managing functions.

A first caching-priority class (also referred to as Class 1) may cause cache managing functions to write data files once: the data file is written to the FIFO cache and immediately copied to tape on the background. When the copying finishes, the file is discarded from the cache. Otherwise said, data files instructed to be written are written in the first region of the cache memory, they are subsequently copied from the first region to the tape drive system. And once the copy is finished, data files are evicted from the first region of the cache memory, that is, data files are deleted from the FIFO region of the cache memory. The copy is advantageously performed as a background task of the server. This allows providing caching during writes: data files can be written to the cache memory first and moved to tape asynchronously in the background; especially when the tape library is busy. Thus, writes do not need to wait for on-going reads on a tape of the tape drive system to finish, before the write can start.

A second caching-priority class (also referred to as Class 2) may cause cache managing functions to write the data files and then read data files once. To this aim, a data file is written to the FIFO cache and in the background copied to tape. The data file is kept in the FIFO cache until the next read operation to the file has occurred. If after the first read operation the file is read multiple times, it is moved to the LRU cache of the cache memory. If after the initial read operation the file is not read any more within a time period or until cache space needs to be reclaimed, it is evicted from the cache. In other terms, Class 2 causes the cache management functions to write data files instructed to be written in the first region of the cache memory, to subsequently copy data files stored on the first region to the tape drive system, the copy being performed as a background task of the server. Then the cache management functions determine whether, after a first read of the data files written in the first region, the data files are read one or more supplementary times. In the event the data files are determined to be read one or more supplementary times, the data files are moved into the second region of the cache memory. On the contrary, in the event the data files are not determined to be read one or more supplementary times, data files are evicted from the first region of the cache memory. Hence, Class 2 advantageously provides caching during writes and provides caching for subsequent reads and support write-verify operations. Data files that have been placed on the tape drive system, but are still accessed regularly by some users (e.g. the most frequently used part of an archive) are stored on the cache memory. Therefore, these accesses do not suffer from the high latency of tape. Consequently, multiple users can read the same data files stored in the FIFO area, thus decreasing their access time to the data files, while the data files are stored on the tape drive system.

A third caching-priority class (also referred to as Class 3) may cause cache managing functions to prefetch the whole file into the FIFO cache, for an existing file which has already been written. If after the initial read operation the file is read multiple times, it is moved to the LRU cache. Thus, a set of data files is prefetched on the first region of the cache memory that were previously stored in the first region of the cache memory, and it is determined whether, after a first read of the prefetched set of data files, one or more data files of the prefetched set are read one or more supplementary times. In the event one or more data files of the prefetched set are determined to be read one or more supplementary times, the set of data files is moved into the second region of the cache memory, that is, the LRU region. This class advantageously provides read caching by reading the file to cache before the read command from the application or user is issued.

A fourth caching-priority class (also referred to as Class 4) may cause cache managing functions to perform prefetching on the second region of the cache memory by prefetching a set of data files that were previously stored in the first region of the cache memory. Thus, an existing file which has already been written will be read sequentially more than once soon. Thus, this class provides read caching by reading the file to cache before the read command from the application or user is issued.

A fifth caching-priority class (also referred to as Class 5) may cause cache managing functions to fetch the data file up to the maximum offset that has been accessed at any given time into the LRU cache. An existing file which has already been written will be read in a random fashion. This class provides read caching by reading the file to cache before the read command from the application or user is issued. Otherwise said, this class cause placing data files into the second region of the cache memory up to the maximum offset that has been accessed at any given time. Interestingly, random writes to a data file can be absorbed in the cache memory. Thus, before writing the relevant byte ranges to the tape drive system, the relevant byte ranges can be sort by starting offset in the data file. Successive sequential read operations to that data file will not need to seek back and forth on tape; it is to be understood that if the file is still in the cache, it can of course be served from the cache without going to the tape drive system at all.

A sixth caching-priority class (also referred to as Class 6) may cause cache managing functions to immediately place data files into the first region of the cache memory when a data file caching class is set, independently of whether the data files are accessed or not, and evict data files from the cache memory when a configurable time interval has expired. This allows to prevent infinite residence of files in the first (FIFO) or second (LRU) regions of the cache memory. A maximum time interval can be configured by a user or an application which is the maximum residency time of a file in cache. It is to be understood that in the event neither the user nor the application define this maximum time, a default maximum residency time of a file in cache can be selected by cache managing functions. The maximum residency time allows regulating the amount of data stored in the cache memory. Especially, old data will be evicted.

In addition, the user or application can reset the cache priority class via the predefined extended attribute. Upon reception of the cache priority class reset, the file will be removed from cache after assuring its residency on tape. Again, this allows managing the amount of data files stored on the cache memory.

In order to improve the support of common use cases, a cache priority class for a given file can be changed over time by the user or application. For example, when a file is written to the disclosed novel tape appliance system it is assigned to Class 1 assuring that the file will be written to the FIFO cache. This advantageously eliminates the need for positioning the tape during the user-write process.

According to the Class 1 policy, the data file will be immediately written to tape and once this is done, the file is discarded from the FIFO cache. Now, if the user or application wants to sequentially read the file, prior to executing the read command, the user or application assigns Class 3 to the data file via a predefined extended attribute. The tape appliance will then recognize the new class assignment and it processes the file by checking if the file is in FIFO or LRU cache. If the file is in FIFO or LRU region of the cache memory, it is assured that the file is not removed until it has been read once, and if the file is not in FIFO or LRU region of the cache memory, the file is read from tape to FIFO cache. Advantageously, this processing assures fast read access because the file is in FIFO cache already before the read-command is sent by the application or user. Moreover, by prefetching large files from the tape drive system into the cache memory, even before the user requests the whole file, this allows to keep the tape drive system busy for as short time as possible per user read, thereby freeing it and allowing other users/applications to use it.

It is to be understood that more combinations of cache priority classes are possible, during the normal operation of the tape appliance, e.g. depending on the workload of the tape drive system server.

By writing backup data to the cache memory first, the write-procedure itself becomes advantageously shorter at least for the following reasons. The seek time for cache memory is in the order of a few milliseconds, whereas the seek time required to reach the end of a tape of the tape drive system and start writing is in the order of tens of seconds. Furthermore, cache memory typically provides superior bandwidth than tape. For instance, cache memory Hard Disks has a larger bandwidth. In addition, having shorter write times (backup windows) reduces the probability of the remote system failing before the backup finishes. Another advantage of having cache memory in the tape drive system server is that the backup metadata of the tape drive system can be stored thereon. Thus, this avoids the need to go to tape when a user or an application just wants to query the backup.

The restore procedure can also be sped up, even in the case that the data-to-be-restored are not already present in the cache: indeed, the system may prefetch data that belong to the same backup and have the same backup version or timestamp or belong to the same directory. These files can then be efficiently retrieved from the cache memory. In case an incremental block-level backup is used (as opposed to file-level), multiple files can be reconstructed in the cache with one pass over the tape of the tape drive system; in that case the blocks will typically be interleaved on tape.

As another advantage, writing many files in parallel does not result in the files being interleaved on tape: indeed, the writes are absorbed on the cache memory first, and they are then written in their entirety to tape when they age out of the cache memory. Otherwise said, attributes associated with data files are used by the cache management functions to optimize concurrent data writes and/or reads by multiple users in parallel.

In the event some large data files to be stored are associated with smaller files, with each small file containing a thumbnail or a low-resolution version of the content of the large file, he cache management function places the small files in the cache for quick access.

The cache memory may comprise one or more storage devices such as magnetic tape medium. The file system interface is typically managed using an LTFS file system. It is to be understood that another file system may be used. The LTFS file system interface runs in the server 102, to which both the tape library and the cache memory are directly attached. The cache memory is used as a cache for the LTFS file system, providing advantageously fast random access to the data stored on the storage means. It is to be understood that while the following text uses HDDs as cache memory, any other storage medium may be used.

In embodiments, the HDDs of the cache memory may be used by the tape drive system server as raw devices, that is, with no filesystem (such as ext3). In that case, either the cache will be a block-level one (as opposed to a file-level one) or LTFS will need to implement file storing functionality for HDDs.

The cache management functions may be implemented as a computer program running on the tape drive system server 102 and executed by the server. For instance, and in reference to FIG. 2, the cache management functions may be implemented inside the LTFS code of the LTFS software adapted to manage the tape drive system 104.

Preferably, the computer program implementing the cache management functions is a user-space program component. Advantageously, this allows improving the portability as a user-space software component (as opposed to a kernel-space one) allows for a low implementation complexity.

In embodiments, the cache management functions and all the caching functionality may be implemented outside LTFS, as an external module. Thereby LTFS can be replaced with any other tape file system in the future. It is to be understood that the external module will need to interface with both the Operating System of the tape drive system server and the tape file system.

The invention claimed is:

1. A tape drive system server comprising:
   a non-volatile memory configured as a cache memory to store data files, at least part of the cache memory comprising a first region that is managed using a First In First Out (FIFO) policy management and a second region that is managed using a Least Recently Used (LRU) policy management;
   a file system interface configured to interact with data files stored on a tape drive system; and
   an interface configured to allow one or more remote systems reading and writing data stored on the storage means and/or on the cache memory;
   wherein the server is configured to:
   receive from the one or more remote systems a write request for writing one or more data files to the tape drive system and to the cache memory;
   analyze the write request to identify attributes associated with the one or more data files;
   determine, based on the attributes, to write the one or more data files to the first region or the second region by the one or more remote systems;
   the storage of files in the first and second regions is performed in accordance with a set of rules for cache capacity management, wherein the set of rules comprises at least the following rules:
   i) if the first region is full, then oldest files of the second set are copied to the storage and evicted from the first region;
   ii) if the first region is full and the second region has free capacity, then the first region gains a given percentage of the free capacity of the second region;
   iii) if the second region is full, then the files of the second set with a least number of access and an oldest last-access time are copied to the storage and evicted from the second region; and
   iv) if the second region is full and the first region has free capacity, then the second region gains a given percentage of the free capacity of the first region;
   store the one or more data files to the first region or the second region based on the attributes; and
   store an identified data file from the first region or the second region to the tape drive system in accordance to the FIFO policy management or the LRU policy management.

2. The tape drive system server of claim 1, further comprising:
   cache management functions to interpret the attributes associated with the one or more data files.

3. The tape drive system server of claim 1, wherein the attributes correspond to caching-priority classes.

4. The tape drive system server of claim 2, wherein a first caching-priority class causes the cache management functions to:
   write the one or more data files instructed to be written to the first region of the cache memory;
   subsequently copy the one or more data files stored on the first region to tape drive system, the copy being performed as a background task of the server; and
   once the copy is finished, evict the one or more data files from the first region of the cache memory.

5. The tape drive system server of claim 2, wherein a second caching-priority class causes the cache management functions to:
   write the one or more data files instructed to be written to the first region of the cache memory;
   subsequently copy the one or more data files stored on the first region to the tape drive system, the copy being performed as a background task of the server;
   determine whether, after a first read of the one or more data files written to the first region, the one or more data files are read one or more supplementary times;
   in the event the one or more data files are determined to be read one or more supplementary times, move the one or more data files to the second region of the cache memory;
   in the event the one or more data files are not determined to be read one or more supplementary times, evict the one or more data files from the first region of the cache memory.

6. The tape drive system server of claim 2, wherein a third caching-priority class causes the cache management functions to:
   prefetch on the first region of the cache memory a set of data files that were previously stored in the first region of the cache memory;
   determine whether, after a first read of the prefetched set of data files, one or more data files of the prefetched set are read one or more supplementary times; and
   in the event data files of the prefetched set are determined to be read one or more supplementary times, move the prefetched set of data files to the second region of the cache memory.

7. The tape drive system server of claim 2, wherein a fourth caching-priority class causes the cache management functions to:

prefetch on the second region of the cache memory a set of data files that were previously stored in the first region of the cache memory.

8. The tape drive system server of claim 2, wherein a fifth caching-priority class causes the cache management functions to:
place the one or more data files into the second region of the cache memory up to the maximum offset that has been accessed at any given time.

9. The tape drive system server of claim 2, wherein a sixth caching-priority class causes the cache management functions to:
place immediately the one or more data files into the first region of the cache memory when the one or more data files caching class is set, independently of whether the one or more data files are accessed or not; and
evict the one or more data files from the cache memory when a configurable time interval has expired.

10. The tape drive system server of claim 3, wherein:
a caching class is specified either by a user or an application; and
the cache management functions further assign a default caching class for the one or more data files for which a caching class has not been specified by the user or the application.

11. The tape drive system server of claim 1, wherein the attributes are extended attributes, whose format is compatible with a given data format of a data file.

12. The tape drive system server of claim 1, where attributes associated with the one or more data files are used by the cache management functions to optimize concurrent data writes and/or reads by multiple users in parallel.

13. A tape appliance system, comprising:
a tape drive system server including a non-volatile memory configured as a cache memory to store data files, at least part of the cache memory comprising a first region that is managed using a First In First Out (FIFO) policy management and a second region that is managed using a Least Recently Used (LRU) policy management;
a file system interface configured to interact with data files stored on a tape drive system; and
an interface configured to allow one or more remote systems reading and writing data stored on the storage means and/or on the cache memory;
wherein the server is configured to:
receive from the one or more remote systems a write request for writing one or more data files to the tape drive system and to the cache memory;
analyze the write request to identify attributes associated with the one or more data files;
determine, based on the attributes, to write the one or more data files to the first region or the second region by the one or more remote systems;
the storage of files in the first and second regions is performed in accordance with a set of rules for cache capacity management, wherein the set of rules comprises at least the following rules:
i) if the first region is full, then oldest files of the second set are copied to the storage and evicted from the first region;
ii) if the first region is full and the second region has free capacity, then the first region gains a given percentage of the free capacity of the second region;
iii) if the second region is full, then the files of the second set with a least number of access and an oldest last-access time are copied to the storage and evicted from the second region; and
iv) if the second region is full and the first region has free capacity, then the second region gains a given percentage of the free capacity of the first region;
store the one or more data files to the first region or the second region based on the attributes; and
store an identified data file from the first region or the second region to the tape drive system in accordance with the FIFO policy management or the LRU policy management; and
a tape drive system, the server interfaced therewith.

14. The tape appliance system of claim 13, wherein the tape drive system is a tape library.

15. A device comprising a non-transitory computer readable storage medium readable by a processing circuit and storing computer readable instructions thereon that, when executed by the processing circuit, implement cache management functions, wherein the device comprises:
a tape drive system server having a non-volatile memory configured as a cache memory to store data files, at least part of the cache memory comprising a first region that is managed using a First In First Out policy management and a second region that is managed using a Least Recently Used policy management;
a file system interface configured to interact with data files stored on a tape drive system; and
an interface configured to allow one or more remote systems reading and writing data stored on the storage means and/or on the cache memory;
wherein the device is configured to:
receive from the one or more remote systems a write request for writing one or more data files to the tape drive system and to the cache memory;
analyze the write request to identify attributes associated with the one or more data files;
determine, based on the attributes, to write the one or more data files to the first region or the second region by the one or more remote systems;
the storage of files in the first and second regions is performed in accordance with a set of rules for cache capacity management, wherein the set of rules comprises at least the following rules:
i) if the first region is full, then oldest files of the second set are copied to the storage and evicted from the first region; and
ii) if the first region is full and the second region has free capacity, then the first region gains a given percentage of the free capacity of the second region;
iii) if the second region is full, then the files of the second set with a least number of access and an oldest last-access time are copied to the storage and evicted from the second region; and
iv) if the second region is full and the first region has free capacity, then the second region gains a given percentage of the free capacity of the first region;
store the one or more data files to the first region or the second region based on the attributes; and
store an identified data file from the first region or the second region to the tap drive system in accordance to the FIFO policy management or the LRU policy management.

* * * * *